MURREL D. SLAYDEN,
HUGH W. STALEY,
INVENTOR(S)

United States Patent Office 3,543,159
Patented Nov. 24, 1970

3,543,159
PULSE RISE TIME AND AMPLITUDE DETECTOR
Murrel D. Slayden, Huntsville, Ala., and Hugh W. Staley, Clearwater, Fla., assignors to the United States of America as represented by the Administrator of the National Aeronautics and Space Administration
Filed Nov. 16, 1967, Ser. No. 683,606
Int. Cl. G04f 9/00
U.S. Cl. 324—181
3 Claims

ABSTRACT OF THE DISCLOSURE

An apparatus for detecting pulses which exceed a specified rise time from a first to a second amplitude including an input buffer for receiving the pulse and for simultaneously applying it to a gate generator and to a delay generator. The gate generator output is coupled to an AND gate and functions to open the AND gate for a time period equal to the specified rise time after the incoming pulse has reached the first amplitude. The delay generator output is also connected to the AND gate and functions to produce a pulse at the time that the incoming pulse exceeds the second amplitude. If the AND gate is still being held open by the presence of the gate generator pulse when the delay generator pulse arrives, this pulse will pass through the AND gate and will be indicative of a no-go condition.

BACKGROUND OF THE INVENTION

The invention described herein was made by employees of the United States Government and may be manufactured and used by or for the Government for governmental purposes without the payment of any royalties thereon or therefor.

This invention relates generally to an electrical testing apparatus and more particularly to a system of evaluating the rise time and amplitude of an electrical pulse to determine whether the pulse exceeds the predetermined tolerance limits.

As the development of space vehicles has progressed in size and complexity, the complexity of verifying the flight readiness of each vehicle has increased. Of particular concern has been the detection of undesirable transients that exceed a certain voltage level and rise time so as to cause a malfunction of a device having a voltage-rise time response characteristic. As an example, a typical computer input pulse could have a specified rise time of between 20 to 180 nanoseconds. Thus, in this case any transient pulse having a rise time between these limits and sufficient amplitude could energize the monitored circuitry, thereby causing a malfunction.

The increase in complexity of detecting such transients has resulted in part from the greater probability that electrical systems on the vehicle will interfere with one another by the conduction of undesirable transients through common power lines, ground return cables, data lines or the like. A second reason for the increase in complexity arises because of the great number of points which must be monitored simultaneously during a complete test, since even after a critical selection of monitor points (such as points in which a transient could cause a malfunction in the system that is necessary for the flight to continue as planned) it is often necessary to monitor several hundred points.

In the past, the monitoring of these points was accomplished by apparatus designed to detect only the amplitude of the transients and did not allow for the testing of the dynamic characteristics of the transient. As a digital circuit is responsive not only to the amplitude of the pulse applied to it bua also to the rise time of the applied pulse little confidence could be given to the test results.

SUMMARY OF THE INVENTION

According to the present invention, it has been found that a detector can be made for determining whether a transient exceeds a specified rise time from first to second predetermined amplitudes by applying the transient to an input buffer which simultaneously applies the transient to a first and a second amplitude detector. The first amplitude detector functions to produce a pulse having a width equal to the specified rise time when the transient exceeds the first predetermined amplitude and the second amplitude detector functions to produce a pulse when the incoming transient exceeds the second predetermined amplitude. The outputs from the first and the second amplitude detectors are applied to an AND gate so that if an output pulse appears simultaneously from the first and second amplitude detectors a no-go condition will be indicated.

Accordingly, one object of this invention is to provide a sensor for detecting transients which exceed a specified rise time and amplitude.

Another object of this invention is to provide a sensor for monitoring electrical devices having a voltage rise time response characteristic.

BRIEF DESCRIPTION OF THE DRAWINGS

These and other objects and advantages of this invention will be more apparent upon reference to the following specifications, appended claims and drawings wherein:

Figure 1:
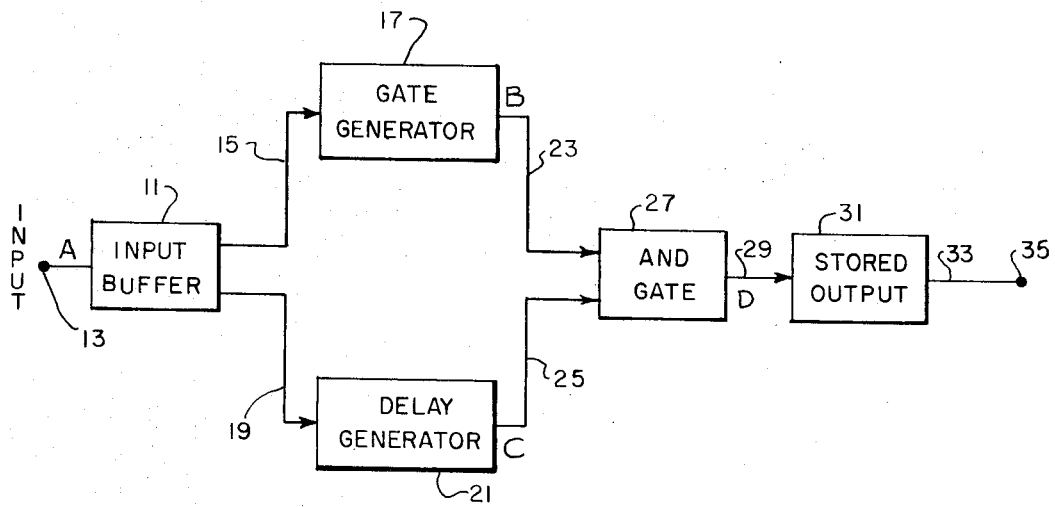
FIG. 1 is a block diagram of the detector constructed in accordance with this invention wherein the blocks of the diagram represent the various elements of the system and the solid lines illustrate the manner in which the elements are electrically interconnected with one another to detect transients which exceed a specified amplitude and rise time.

As shown in the block diagram representation of FIG. 1, the pulse amplitude and rise time sensor comprises an input buffer 11 having an input terminal 13 and output leads 15 and 19. The input terminal is adapted to be connected to the circuit being monitored, the first input buffer output lead 15 is coupled to a gate generator 17 and the second input buffer output lead 19 is coupled to a delay generator 21. The gate generator output lead 23 and the delay generator output lead 25 are coupled to AND gate 27, the latter having its output lead 29 connected to a stored output 31. The output lead 33 of the stored output 31 is coupled to output terminal 35.

Figure 3:
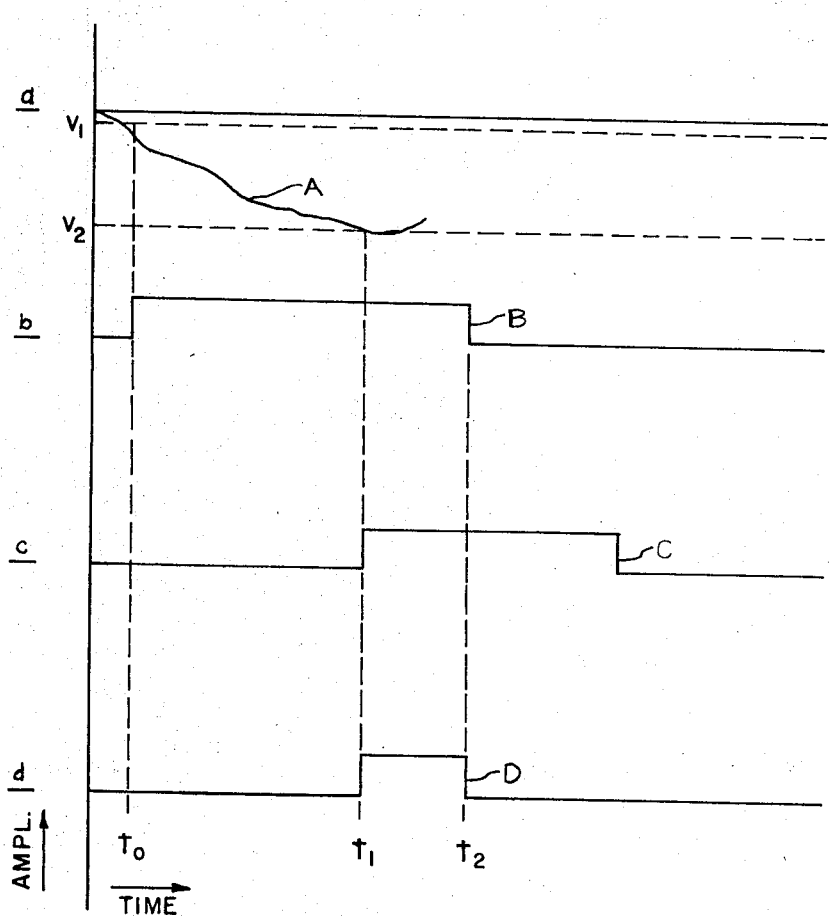
FIG. 3 illustrates waveforms found in the system of FIGS 1 and 2 for one specific set of tolerance limits.

The operation of the pulse rise time and amplitude detector of FIG. 1 is best described with refernce to the representive waveforms shown in FIG. 3. FIG. 3a shows an exemplary negative going transient pulse A reaching a first refernce voltage level $v_1$ at time $t_0$ and a second reference voltage level $v_2$ at time $t_1$. The first and second reference voltage levels may conveniently be the 10% and the 90% amplitude of a known negative digital pulse. In operation, the transient pulse A is coupled to the input terminal 13 and energizes input buffer 11. The input buffer 11 is utilized to provide a high input impedance for the sensor relative to the circuit being monitored and couples the incoming pulse A to the gate generator 17 and the the delay generator 21.

The gate generator 17 comprises an amplitude detector which when triggered has a pulse output of adjustable width and very low rise and fall times. The threshold level of the gate generator 17 is set so that the gate generator will be triggered when the incoming transient pulse A exceeds the first reference level $v_1$ of the known digital pulse and the width of the pulse output is adjusted to the specified rise time for the circuit being monitored. The output pulse of the gate generator 17 is illustrated by the waveform of FIG. 3b, where a positive-going pulse B is initiated at time $t_0$ and continues to time $t_2$. Thus, the time interval $t_0$ to $t_2$ represents the maximum specified rise time from the first reference level $v_1$ to the second reference level $v_2$ for the digital circuity being monitored. The gate generator 17 output pulse B is thereafter applied to lead 23 to open the AND gate 27 for the time period $t_0$ to $t_2$.

The delay generator 21 also comprises an amplitude detector, which when triggered has a pulse output having very low rise and fall times, however its threshold level is set so that the delay generator will be triggered when the incoming transient pulse A exceeds the second reference level $v_2$ of the known digital pulse of the circuit being monitored. The output pulse of the delay generator 21 is illustrated in FIG. 3c, where a positive going pulse C is initiated at time $t_1$ and continues to time $t_3$. The delay generator 21 output pulse C is thereafter applied to the input lead 25 of the AND gate 27. As shown in FIGS. 3b and 3c, the two signals applied to the AND gate 27 are positive during that time interval $t_1$ to $t_2$ and the AND gate will be activated and will transfer the pulse on lead 25 to lead 29. This signal is shown in FIG. 3d as a positive going pulse D for the interval between time $t_1$ and time $t_2$. A memory circuit such as stored output 31 may be provided so that the detector circuit may be read at a convenient time.

In the example shown, the incoming pulse A shown in FIG. 3a reached the second reference voltage level $v_2$ at time $t_1$ at which time the AND gate 27 was still held open by the output pulse B from the gate generator 17. It will be seen however that if the incoming pulse A reaches the second reference voltage level $v_2$ after time $t_2$, the AND gate will no longer be held open by the pulse output B of the gate generator 17 and no pulse will pass through AND gate 27. Also should the incoming pulse A remain below the second voltage level $v_2$, no pulse will pass through the AND gate 27 as the threshold level of the delay generator will not be exceeded. From the foregoing it will be seen that the width of the output pulse of the gate generator 17 determines the critical rise time of the pulse being monitored and the threshold level of the delay generator 21 determines the critical amplitude of the pulse being monitored.

Figure 2:
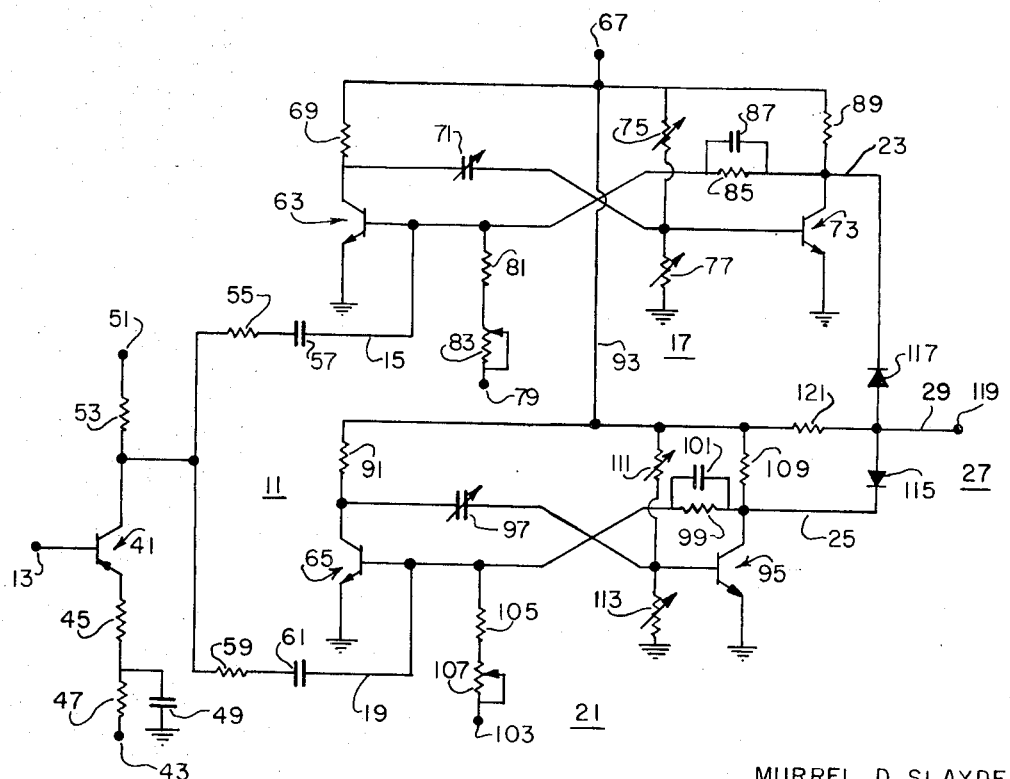
FIG. 2 is a schematic illustration of the system of FIG. 1.

FIG. 2 is a schematic circuit diagram of the pulse rise time and amplitude sensor of FIG. 1. The input buffer 11 for instance, consists of PNP transistor 41 having its base connected to input terminal 13 and its emitter connected to a source of positive potential 43 via the serial connection of resistors 45 and 49, the midpoint of which is coupled to ground via capacitor 49. The collector of transistor 41 is connected to a source of negative potential 51 via resistor 53. The collector of transistor 41 is also coupled to input buffer output lead 15 via the serial connection of resistor 55 and capacitor 57 and to the input buffer output lead 19 via the serial connection of resistor 59 and capacitor 61. Capacitors 57 and 61 provide for AC coupling between the collector of transistor 41 and the respective bases of NPN transistors 63 and 65, the latter forming the input to the gate generator 17 and to the delay generator 21 respectively.

The gate generator 17 comprises a one-shot multivibrator in which the emitter of transistor 63 is coupled to ground and the collector of transistor 63 is coupled to a positive voltage source 67 via resistor 69. The collector of transistor 63 is also coupled to one terminal of variable capacitor 71, the other terminal of capacitor 71 being connected to the base of NPN transistor 73, and to the midpoint of the serial connection of variable resistors 75 and 77, which resistors extend between the positive voltage source 67 and ground. The base of transistor 63 is coupled to a negative source of potential 79 via the serial connection of resistor 81 and variable resistor 83 and is additionally coupled to the collector of transistor 73 by resistor 85 having capacitor 87 connected thereacross. The collector of transistor 73 is coupled to the source of positive potential 67 by resistor 89 and to the AND gate input lead 23. The emitter of transistor 73 is connected to ground.

It will be seen that with the circuity disclosed, the gate generator 17 is arranged so that during the quiescent state transistor 63 is non-conducting and transistor 73 is conducting. The positive potential source 67 provides the collector bias voltage for transistor 63 and 73 and forward bias for transistor 73 by the voltage divider network consisting of resistors 75 and 77. A reverse bias is provided to maintain transistor 63 cut-off by the serial connection of resistors 89, 85 and 81 and variable resistor 83 between the negative potential source 79 and the positive potential source 67. It will thus be seen that in the quiescent state the collector of transistor 73 is essentially at ground potential.

However, when a negative going pulse is applied to input terminal 13, an amplified and inverted pulse is applied to lead 15 and the base of transistor 63 by means of transistor 41, resistor 55 and capacitor 57. When the positive going pulse on the input buffer output lead 15 and the base of transistor 63 reaches the threshold level of the gate generator 17, (determined by the setting of resistor 83) the base of transistor 63 is driven positive causing transistor 63 to be turned on and causing transistor 73 to turn off in the well known manner. With transistor 73 cut-off, the potential of its collector rises essentially to the value of the positive voltage source 67 and provides a positive going pulse on the AND gate input lead 23, the length of which is determined by the time constant of variable resistors 77 and 75 and variable capacitor 71.

In operation, the resistance of variable resistor 83 is adjusted so that the gate generator 17 will be triggered when the incoming transient pulse A exceeds the first voltage reference level $v_1$ and the time constant of resistors 77 and 75 and capacitor 71 is adjusted so that the width of the output pulse of the gate generator 17 equals the specified rise time between the first voltage reference $v_1$ and the second voltage reference level $v_2$.

The delay generator 21 also comprises a one-shot multivibrator and is of similar construction to the gate generator 17. As shown in FIG. 2, the output lead 19 of the input buffer 11 is coupled to the base of transistor 65. The collector of transistor 65 is coupled to the positive voltage source 67 by resistor 91 and lead 93 and is coupled to the base of transistor 95 via variable capacitor 97. The emitter of transistor 65 is coupled to ground as shown and the base of transistor 65 is coupled to the collector of transistor 95 via resistor 99 having capacitor 101 connected thereacross and is additionally connected to a negative potential source 103 by the serial connection of resistor 105 and variable resistor 107. The collector of transistor 95 is connected to input lead 25 of the AND gate 27 and to the source of positive potential 67 via resistor 109 and lead 93. The emitter of transistor 95 is connected to ground and the base is connected to the midpoint of variable resistors 111 and 113 which extend between the positive potential source 67 and ground.

The operation of the delay generator 21 is similar to that of the gate generator 17 as transistor 65 is quiescently held in the non-conducting state and transistor 95 is in the conducting state. The operation of the delay generator 21 differs however from the gate generator 17 in that variable resistor 107 is adjusted so that transistor 65 remains in its non-conductive state until the amplitude of the transient pulse applied to terminal 13 has reached the second voltage reference level $v_2$. It will thus be seen that in the absence of a pulse greater in value than the second voltage reference level being impressed on input terminal 13 and with transistor 95 normally conducting the collector of transistor 95 will be essentially at ground potential. However, when the input to the delay generator 21 exceeds the threshold level of the delay generator, the base of transistor 65 will be driven positive with respect to the emitter and transistor 65 will conduct thereby causing transistor 95 to turn off in the well known manner. With transistor 95 cut-off, the potential of its collector rises essentially to the value of the positive voltage source 67 and provide a positive going pulse on the AND gate input lead 25 as shown in FIG. 3c.

In order to determine whether there is time coincidence between the pulsed output of the gate generator 17 and the delay generator 21, AND gate 27 is provided consisting of diodes 115 and 117. Diode 115 is connected to the collector of transistor 95 and also to output terminal 119 which is also connected to the positive potential source 67 by resistor 121. Diode 117 is connected to the collector of transistor 73 and also to the output lead 29. In the well known manner output terminal 119 will remain essentially at ground potential when either transistor 73 or transistor 95 is conducting but will approach the positive potential level source 67 when transistors 95 and 73 are simultaneously non-conductive.

It is of course to be recognized that the exemplary transient pulse shown in FIG. 3a exceeded the amplitude of the second voltage reference level $v_2$ in the time interval $t_0$ to $t_2$ and thus a pulse as shown in FIG. 3d appeared on the output of the AND gate 31. However, if transient pulse applied to input terminal 13 never exceeded the second voltage reference level $v_2$, the threshold level of the delay generator would never be exceeded and no pulse would be produced by the delay generator 21 and the pulse appearing on the gate generator output lead 23 cannot pass through the AND gate 27. Additionally, if the transient pulse should exceed the second reference level $v_2$ after the time interval $t_0$ to $t_2$ the pulse from the gate generator 17 will have ended and again no pulse will pass through the AND gate 27.

It will now be seen that the present invention provide very fast operation with digital accuracy and the invention can be employed to evaluate pulses of any amplitude and rise time by adjustment of the threshold level of the delay generator 21 and the width of the pulse of the gate generator 17. It will further be seen that a go no-go type output is obtained that may easily be stored if desired and read-out at any time.

We claim:

1. An apparatus for detecting a pulse exceeding a predetermined amplitude and rise time from a first amplitude to the predetermined amplitude comprising:

an input circuit for receiving an input pulse to be evaluated;

gate generator means coupled to said input circuit for producing a substantially rectangularly shaped gating pulse in response to the input pulse exceeding a first amplitude, said gating pulse having a width equal to a predetermined rise time between said first amplitude and said predetermined amplitude;

delay generator means coupled to said input circuit for producing a delay pulse in response to the input pulse exceeding said predetermined amplitude;

a coincidence circuit connected to receive said gating pulse and said delay pulse for producing an output pulse when any portions of the gating pulse and the delay pulse are in time coincidence.

2. A pulse amplitude and rise time detector as claimed in claim 1 wherein:

(a) said input circuit includes means for generating a signal proportional to the input pulse;

(b) said gate generator includes amplitude detecting means for initiating said gating pulse when said generated signal exceeds a first threshold level and;

(c) said delay generator includes amplitude detecting means for initiating said delay pulse when said generated signal exceeds a second threshold level.

3. A pulse amplitude and rise time detector as claimed in claim 1 wherein:

(a) said gate generator comprises a first one-shot multivibrator;

(b) said delay generator comprises a second one-shot multivibrator.

References Cited

UNITED STATES PATENTS

| | | | |
|---|---|---|---|
| 3,204,180 | 8/1965 | Bray et al. | 324—68 |
| 3,250,990 | 5/1966 | Hubbs et al. | 324—68 X |
| 3,437,834 | 4/1969 | Schwartz | 328—110 X |
| 2,685,687 | 8/1954 | Falk | 324—68 XR |

FOREIGN PATENTS 969,972  6/1950  France.

OTHER REFERENCES

Scray, "Automatic Rise Time Measurement," IBM Technical Disclosure Bulletin, vol. 2, No. 6, April 1960, p. 47.

ALFRED E. SMITH, Primary Examiner

U.S. Cl. X.R.

307—235